US009904710B2

(12) United States Patent
Church

(10) Patent No.: US 9,904,710 B2
(45) Date of Patent: Feb. 27, 2018

(54) SYSTEM AND METHOD FOR VALIDATING AND FORMATTING IP RIGHT IDENTIFIERS

(75) Inventor: Nicholas John Church, St. Helier (GB)

(73) Assignee: CPA SOFTWARE LIMITED, Jersey (GB)

( * ) Notice: Subject to any disclaimer, the term of this patent is extended or adjusted under 35 U.S.C. 154(b) by 220 days.

(21) Appl. No.: 14/401,437

(22) PCT Filed: May 18, 2012

(86) PCT No.: PCT/IB2012/000957
§ 371 (c)(1),
(2), (4) Date: Apr. 29, 2015

(87) PCT Pub. No.: WO2013/171526
PCT Pub. Date: Nov. 21, 2013

(65) Prior Publication Data
US 2015/0234826 A1 Aug. 20, 2015

(51) Int. Cl.
*G06F 17/30* (2006.01)
(52) U.S. Cl.
CPC .... *G06F 17/3053* (2013.01); *G06F 17/30011* (2013.01); *G06F 17/30342* (2013.01)
(58) Field of Classification Search
USPC .................................................. 707/600–606
See application file for complete search history.

(56) References Cited

U.S. PATENT DOCUMENTS

2005/0055372 A1* 3/2005 Springer, Jr. ..... G06F 17/30997

FOREIGN PATENT DOCUMENTS

| WO | WO 2001097100 | * | 6/2000 | ............. G06Q 10/00 |
| WO | WO 2006110832 A2 | * | 10/2006 | ........ G06F 17/30011 |
| WO | 2013/171526 A1 | | 11/2013 | |

OTHER PUBLICATIONS

International Search Report and Written Opinion issued in Appln. PCT/IB2012/000957 dated Apr. 11, 2013.

* cited by examiner

*Primary Examiner* — Hosain Alam
*Assistant Examiner* — Tuan-Khanh Phan
(74) *Attorney, Agent, or Firm* — Fiala & Weaver P.L.L.C.

(57) ABSTRACT

A system and method for validating and formatting IP right identifiers is provided. The technique includes accessing an IP right identifier from a database, extracting a set of tokens from the IP right identifier, validating each of the extracted tokens against a list of standard tokens, and determining a set of standard tokens for the IP right identifier based on the validation. The invention further includes formatting the IP right identifier based on the set of standard tokens and a format definition, and storing the formatted IP right identifier in a database.

11 Claims, 6 Drawing Sheets

SYSTEM AND METHOD FOR VALIDATING AND FORMATTING IP RIGHT IDENTIFIERS

BACKGROUND

The invention relates generally to management of intellectual property ("IP") rights, and in particularly to a technique for handling multiple IP right identifiers of an IP right across multiple parties or users.

IP rights are important assets for a company and therefore efficient management of IP rights is critical to success of the company. As a company grows, they create multiple IP rights in the form of patents, trademarks, designs, and so forth that need to be registered and maintained across different geographies. Typically, IP right identification codes such as patent application numbers have different formats around the world for the same IP right. There is no global standard for IP right identifiers associated with an IP right. Many national and/or commercial databases have errors due to the above limitation. IP law firms and/or IP service providers therefore face daunting task to handle such discrepancies manually, thereby reducing efficiency while incurring cost.

Current techniques to match IP right identifiers to the corresponding IP right with certain degree of automation include creating hundreds or thousands of business rules for each software application to handle disparate data from a Patent and Trademark Office ("PTO") and commercial databases. However, the creation of such rules for validating each unique case is time consuming and inefficient. Moreover, the multiple IP right identifiers may not conform to a standard even after application of such rules.

In recent years patent and trademark offices around the world have been working towards harmonization of the processing of patent related information by forming and implementing standards of information and data exchange. In that regard, open protocol standards have been implemented by the World Industrial Property Organization ("WIPO"), such as ST. 36, "Recommendation for the Processing of Patent Information Using XML (Extensible Markup Language). ST.36 is an application of the Internet standard for XML found at www.w3c.org.

The Extensible Markup Language (XML) is a subset of SGML. Its goal is to enable generic SGML to be served, received, and processed on the Web in the way that is not possible with HTML. XML has been designed for ease of implementation and for interoperability with both SGML and HTML. The standard ST.36 recommends using its version of XML applied to resources for filing, processing, publication, and exchange of "all types of patent information" according to the Handbook of Industrial Property Information and Documentation, Standard ST.36, ver. 1.2 (23 Nov. 2007). The WIPO handbook reports that ST.36 is based in large part on "Patent Cooperation Treaty, Administrative Instructions, Part 7, Annex F, Appendix I." The purpose of ST. 36 "is to provide logical, system-independent structures for patent document processing, whether for text or image data." The standard provides protocols for text of patent documents recorded as character coded data, whole pages of documents as images, and data within full-text documents that cannot be recorded as character coded data such as drawings, formulas, and some complex tables.

Another intellectual property protocol is used to exchange and communicate trademark information. The trademark extensible markup language ("TM-XML") is used within industry, users, and governmental industrial property offices as an open standard for the exchange and processing of trademark documents and transaction records using XML. It was defined in June, 2003 by the Office of Harmonization in the Internal Market, and final version 1.0 was the basis for WIPO standard ST.66, "Recommendation for the Processing of Trademark Information using XML (Extensible Markup Language)." The ST.66 standard states that it is " . . . aimed at providing guidance to national, regional and international authorities who, on the basis of national industrial property laws or international industrial property conventions, publish announcements, either on trademark applications or on registrations of trademarks."

In the management of large volumes of patents and trademarks and the services related to procuring and maintaining those rights, large amounts of specialized data is retained in databases and transferred between various entities. For example, a corporation may use an intellectual property ("IP") management software application to track and maintain its various patents and patent applications around the world. Data from this application could be exchanged with another IP management application that is used by an external legal service provider handling filing and docketing of patents and trademarks. Data could also be exchanged with various law firms handling the corporation's patent and trademark matters. Data could further be exchanged with an external legal service provider handling the payment of maintenance fees on the company's patents and trademarks around the world. A problem with such a network of applications and service providers is that each application or provider uses its own data from a specially formatted database making standardized data transfer between the various applications impossible.

Although ST.36 and TM-XML/ST.66 have improved communications between applicants and patent offices, it has been demonstrated as inadequate for a means of information transfer and management relating to procurement and maintenance of intellectual property by businesses and legal service providers. For example, a company owning thousands of patents may use one type of IP management application in-house, but it's outside legal counsel and legal services outsourcing providers may each use different IP management software which have different formats and protocols to store and transfer the data. In one example, three different IP databases are created and maintained: one by the company that is the owner of the patents, one by legal counsel at a law firm, and one by the legal services outsourcing provider. Each such IP database has requirements for patent and trademark data processing and transfer that are different than those available in ST. 36 and TM-XML. Further, each such database is typically formatted and processed differently thus preventing integration and seamless information transfer with another database and preventing the transfer of critical, specialized information in a standard way. Duplicate databases for information such as patent prosecution, docketing and processing, document attachments, and annuity fee payments are created.

It is therefore desirable to provide a technique so as to provide a set of standard IP right identifiers as well as the ability to standardize formatting of IP right identifiers according to a set of standard formatting rules regardless of the state or regional PTO in which the IP right originated from.

BRIEF DESCRIPTION

Briefly in accordance with one aspect of the technique, a system and process are provided for validating and formatting IP right identifiers. The embodiments provide for using business rules to create taxonomy for component parts of an IP right identifier, which are defined as "tokens." Component parts can include any type of identifier that may or may not be unique to the IP right, but in combination can be used to verify the identity, status, and/or ownership of the right. For example, a patent grant number, trademark registration number, an application serial number, country code, application type identifier, or a date and index in a published patent application are all examples what could be component parts of an IP right identifier. The component parts, or tokens, may be stored separately in a database for reconstruction later into an IP right identifier of various formats according to the business and formatting rules demanded by a software system. The process enables a nearly unlimited number of different formats for an identifier to co-exist for the same IP right.

The preferred and alternative embodiments of the invention include accessing an IP right identifier from a database, extracting a set of tokens from the IP right identifier, validating each of the extracted tokens against a list of standard tokens, and determining a set of standard tokens for the IP right identifier based on the validation. The invention may also include formatting the IP right identifier based on the set of standard tokens and a format definition, and storing the formatted IP right identifier in a database. Processor-based systems and computer programs that afford such functionality may be provided by the present technique.

Advantages to the present systems and methods include varying ways to format an identifier for an IP right while maintaining a distinct process to identify the right, which will reduce the confusion that generally arises when data formats from various government agencies and corporations are different for the same IP right. For example, in a patent context, business rules from each related patent office around the world could be extracted and applied to each IP right record that issued from each office to ensure that the IP right is identified correctly when all records related to the right are combined in a single database.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques are generally directed to validating and formatting IP right identifiers. Such techniques may be useful in management of a variety of IP rights, such as patents, trademarks, industrial designs, and so forth. Though the present discussion provides examples generally in context of patents, one of ordinary skill in the art will readily apprehend that the application of these techniques in other contexts, such as for trademarks, copyrights, industrial designs, and so forth, is well within the scope of the invention.

There is described herein preferred and exemplary embodiments for a system and method for validating and formatting IP right identifiers. In one embodiment, the IP right identifier is parsed, validated, and converted into a standard format according to pre-defined formatting rules and definition.

Figure 1:
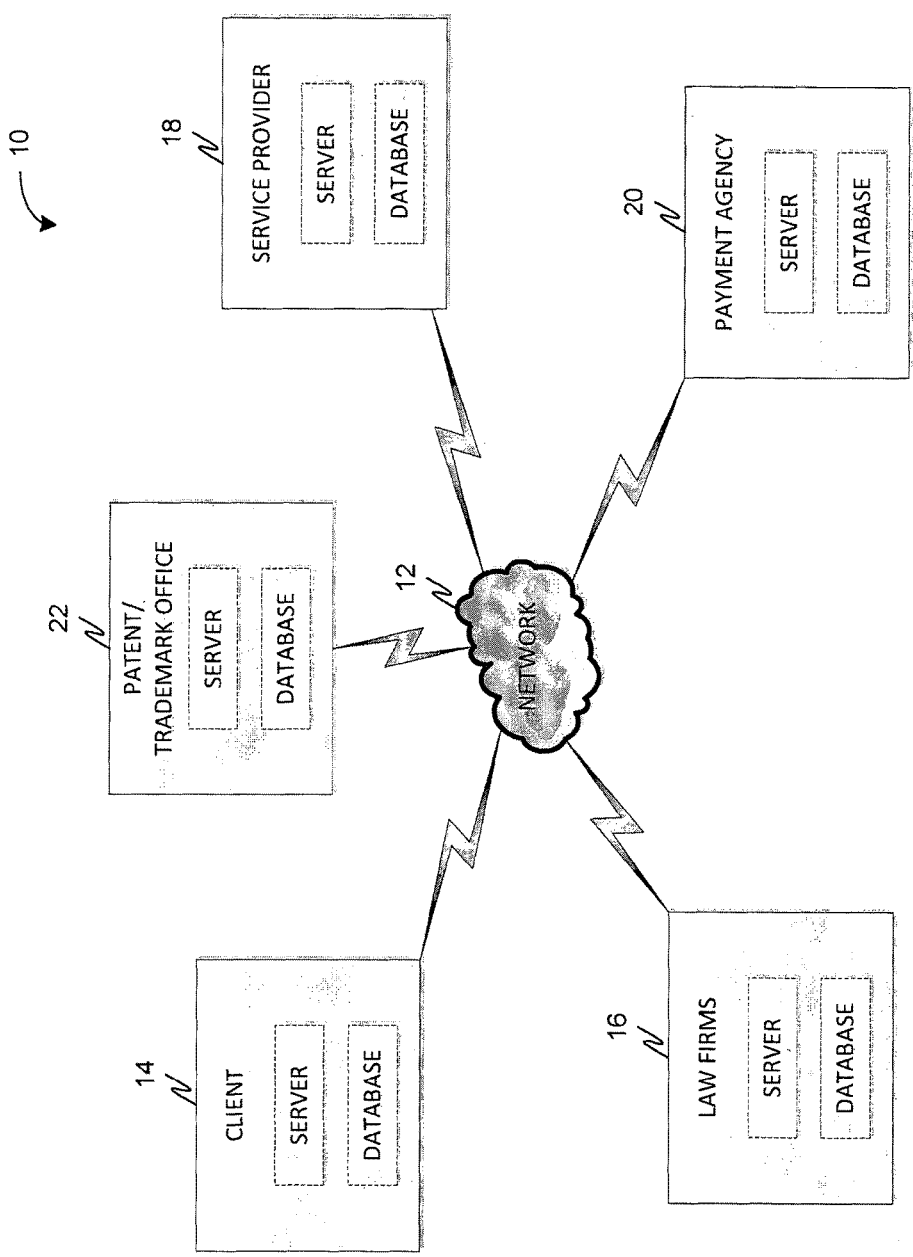
FIG. 1 is a schematic of a network system wherein the exemplary embodiments for validating and formatting IP right identifiers may be implemented in accordance with aspects of the present technique.

Referring now to FIG. 1, a schematic of a network system 10 is illustrated. The network system 10 is configured to implement the preferred and alternative embodiments for validating and formatting IP right identifiers in accordance with aspects of the present technique. The network system 10 includes one or more subsystems in communication with each other via a secured communication channel 12. The one or more subsystems may include, but is not limited to, a client subsystem 14, a law firm subsystem 16, a service provider subsystem 18, a payment agency subsystem 20, and a patent and trademark office (PTO) subsystem 22. In certain embodiments, each of the one or more subsystems may generally include a server and a database. The server is configured to access the corresponding database. The secured communication channel 12 may be a wired or a wireless communication network such as Internet, local area network (LAN), wide area network (WAN), and so forth. Each server may connect to the communication channel 12 through a standard or high-speed network connection such as Ethernet LAN, cable modem, Digital Subscriber Line (DSL) or T1/T5 line. It should be noted that the transmission of information between the one or more subsystems may be in real time or in batch mode.

In certain embodiments, a client 14 or a law firm 16 may request the payment of annuity fee for a particular IP asset to the service provider 18. The service provider 18 may in turn send instruction to an associated payment agency 20 which in turn will pay the annuity fee for particular IP asset to the PTO 22. As will be appreciated by those skilled in the art, all such instructions or communication from one party to the other employ an IP right identifier to identify the particular IP asset. However, as discussed earlier, each of the varied users listed herein may have their respective standard for IP right identifier while referring to an IP asset. For example, the client 14 and/or the law firm 16 may refer to an IP asset using their internal docket number as the IP right identifier. Alternatively, the client 14 and/or the law firm 16 may employ an IP right identifier where the internal docket number is prefixed to the IP asset application or serial number provided by the patent and trademark office. Similarly, the service provider 18 or the payment agency 20 may employ their system generated matter number as the IP right identifier or may prefix the client provided IP right identifier with its own matter number. Moreover, even the multiple patent and trademark offices (PTOs) 22 around the world do not follow a set standard to refer to an IP asset. For example, some of the PTO may just use the last two digits of the year in their IP right identifier while the others may use all the digits of the year in their IP right identifier. In short, none of the employed IP right identifiers are standards while referring to respective IP assets, thereby resulting in inefficiency and need for manual validation.

Figure 2:
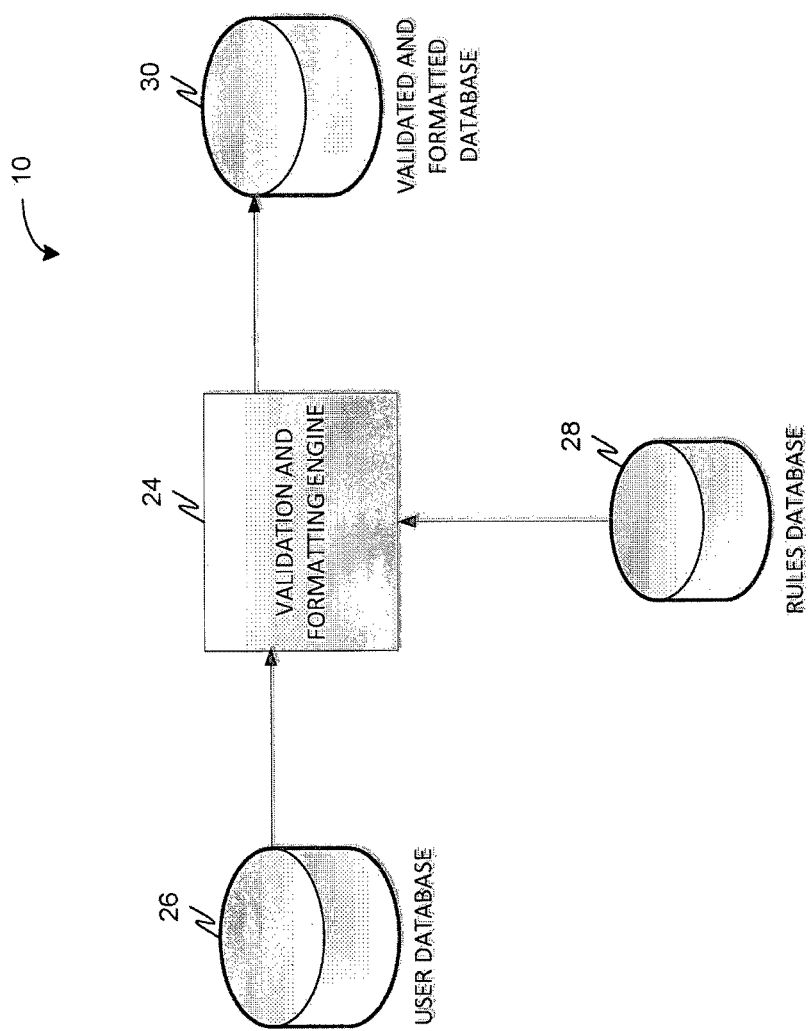
FIG. 2 is a schematic of functional components of a network system for validating and formatting IP right identifiers in accordance with aspects of the present technique.

A schematic of functional components of the network system 10 for validating and formatting IP right identifiers is illustrated in FIG. 2 in accordance with aspects of the present technique. As illustrated, the network system 10 described herein employs a validation and formatting engine to convert an incoming IP right identifier into a standard IP right identifier. In certain embodiments, the validation and formatting engine may reside in service provider subsystem. However, it should be noted that, in certain embodiments, such validation and formatting engine may reside in any of the one or more subsystem of the network system 10. Alternatively, it should be noted that, in certain embodiments, the validation and formatting engine may exist separately on the network system 10 within a specialized subsystem.

The validation and formatting engine 24 access an IP right identifier from a user database 26. The IP right identifier may be a user-defined IP right identifier or other formatted IP right identifier (e.g., PTO defined IP right identifier) on the user database 26. The access to user database 26 may be via a network, directly through controller software, or via a copy of user database on a computer-readable media. The user-defined IP right identifier is analyzed against a rules database 28 via the validation and formatting engine 24. The rules database 28 contains a set of rules for validating IP right identifier and a standard format definition. For example, if a date in user-defined IP right identifier is in a format other than the format specified by the rules database 28, then rules can be applied to recognize and convert the date in user-defined IP right identifier into specified format. Thus, the validation and formatting engine 24 validates and formats the IP right identifier using the set of rules and the standard format definition. Further, the validation and formatting engine 24 stores the validated and formatted IP right identifier in a validated and formatted database 30.

The validation and formatting engine 24 adopts a token-based approach to validate and format the user-defined IP right identifier. The basis of the token based approach is to treat an IP right identifier as a number of tokens. Such tokens may include, but are not limited to, country code, IP type, index/sequence number, date, separator/delimiter, and so forth. As will be appreciated by those skilled in the art, the user-defined IP right identifiers, regardless of their formats, includes all the relevant tokens that are necessary to make up any formatted IP right identifiers. However as discussed above, clients may format individual tokens in a slightly different way (e.g. format a date as 'YY' where the standard IP right identifier should be formatted as 'YYYY'), leave out tokens with an obvious value (e.g. leave 'US' out of all US patent numbers), include tokens that have no relevance to the standard IP right identifier (e.g. prefix each IP right identifier with an internal file/docket number), include separators/delimiters in the IP right identifier (e.g. include hyphens to separate different tokens), and so forth.

The validation and formatting engine 24 then associates a number of formatting rules with a range of tokens extracted from the user-defined IP right identifier: all tokens (countries, IP types, dates, number types), country token (just this country), country and IP type token (this country and IP type combination), IP type token (just this IP type), country, IP type, and date token (a specific date range for a specific IP type in a specific country), country, IP type, date, and number type token (a specific date range for a specific number type associated with a specific IP type in a specific country), and so forth. A hierarchy may be defined that describes the scope of a formatting rule, so a rule would not be applied to an IP right that was not relevant. It should be noted that a formatting rule typically includes two components: a set of acceptable and unacceptable token lists, and a format definition. The tokens are analogous to 'nouns' while the format definitions are analogous to 'verbs', so the formatting rule becomes a 'sentence' for defining and building a formatted IP right identifier.

An incoming or a user-defined IP right identifier is validated against one or more acceptable token lists. These lists define the tokens that are expected and each token is given a unique name. For example, in certain embodiments, token list may have the following definition:

| Token Name | Token Definition |
| --- | --- |
| CountryCode | 'US', non-case sensitive |
| ApplicationYear | Year |
| Index | Numeric digits, 1-9 |

The format definition may be given as:
   CountryCode, "AA"
   ApplicationYear, "YYYY"
   Index, "0000000"
where, "AA" is a variable defined as two characters in upper-case; "YYYY" is a variable defined as a year formatted as 4-digits comprising century and year; and "0000000" is a variable defined as a 7-digit number with leading zeroes if required.

In certain embodiments, the technique involves the validation and formatting engine 24 to be able to parse incoming or user-defined IP right identifier that 'roughly' meet the token list definition and output validated and formatted IP right identifier. Example:

| Incoming Identfier | Formatted Identifier | Explantaory Notes |
| --- | --- | --- |
| US-2006-8876 | US20060008876 | '2006' is a date<br>'8876' is an index |
| 15P665876-1999 | US19990665876 | '1999' is a date<br>'US' is omitted<br>15P is a user-define prefix<br>Sequence is altered |

The validation and formatting engine 24 needs to deal with a number of issues, some examples being:

| Issue | Potential/Adopted Solution |
| --- | --- |
| Tokens in user-defined IP right identifiers may be ambiguous | A number of token lists may be defined where you can specify per list whether or not the sequence in the user number can be different;<br>A weighting can be associated with each token match and the total number match wherein the highest score 'wins' (e.g., fuzzy logic matching). |

-continued

| Issue | Potential/Adopted Solution |
|---|---|
| A syntax needs to be defined for the domain-specific language (DSL) | Lexical analysis tools such as Lex and YACC may be considered as a basis |
| Changing a user-defined IP right identifier may cause communication issues among the users or with the client | The data repository will need to store all versions (the client version, the service provider version, and the PTO version) of IP right identifiers so we can always communicate with the client using the originally reported version, and with the PTO and/or agent for payment purposes in their respective versions. |

In summary, the technique involves using format rules to create a taxonomy of the component parts of an IP right identifier (such as the country code, type identifier, date and index in a patent number), and storing the component parts separately in a database. The embodiments enable a large number (potentially infinite) of different formats to co-exist for the same IP right identifier. In a patent or trademark context, the present embodiments enable separate character or number formats for use by the owner, renewals provider, and government agency to exist concurrently, which reduces confusion that generally arises when formats are different for the same IP right identifier. For example, if a patent number was split up into its component parts according to the present technique (e.g., using business or format rules), then each part of the number could be stored into the system's database, to enable the IP right identifier to be re-constituted into a large number of variations. The variations of the identifier is then used to match against client or owner-supplied IP right data.

Additionally, in certain embodiments, format rules from each patent office could be extracted and applied to each record that issued from that office to ensure the IP right identifier is identified correctly. Further, in certain embodiments, fuzzy logic may be applied to a data record to find the most likely format that is correct based on the extracted rules and user specified format rules.

Figure 3:
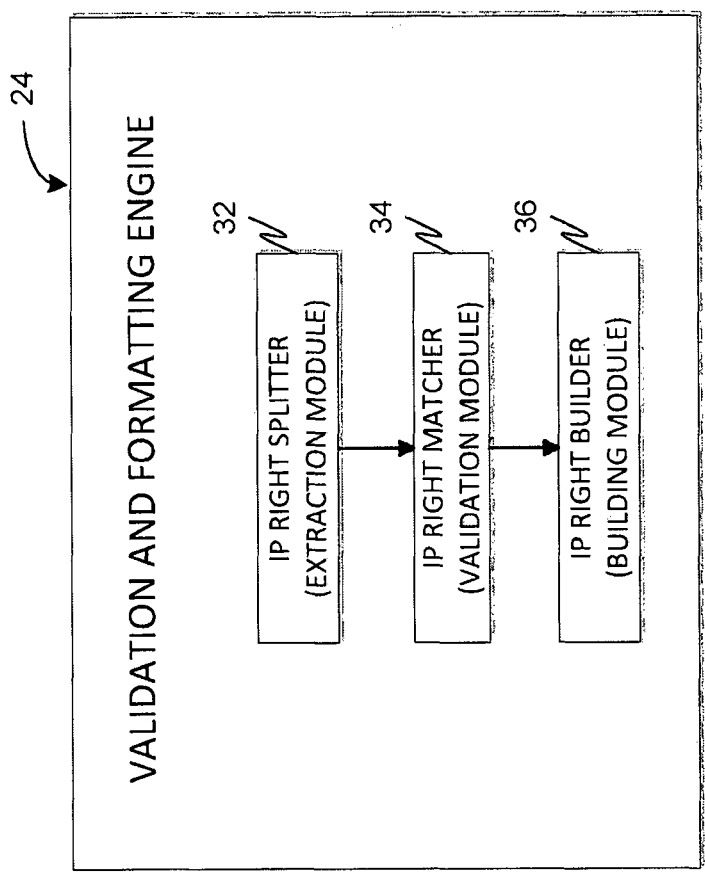
FIG. 3 is a schematic of functional components of a validation and formatting engine in accordance with aspects of the present technique.

A schematic of functional components of the validation and formatting engine 24 is illustrated in FIG. 3 in accordance with aspects of the present technique. As illustrated, the validation and formatting engine 24 includes an IP right splitter (an extraction module) 32, an IP right matcher (a validation module) 34, and an IP right builder (a building module) 36. The IP right splitter 32 splits incoming or source IP right identifier into component tokens (i.e., the extraction module 32 extracts component tokens from the incoming or source IP right identifier) while the IP right matcher 34 matches the component tokens (i.e., the validation module 34 validates the extracted tokens) against a list of acceptable and unacceptable tokens and determines corresponding standard tokens for the unacceptable tokens. The IP right builder (or the building module) 36 builds a standard formatted IP right identifier for the given incoming or source IP right identifier from the set of acceptable and standard tokens based on a format definition.

The validation and formatting engine may be implemented in programmable hardware devices such as programmable gate arrays, programmable array logic, programmable logic devices, and so forth. Alternatively, the validation and formatting engine may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically or operatively together, comprise the engine and achieve the stated purpose of the engine. Indeed, an engine of executable code could be a single instruction, or many instructions, and may even be distributed over several different code segments, among different applications, and across several memory devices.

Figure 4:
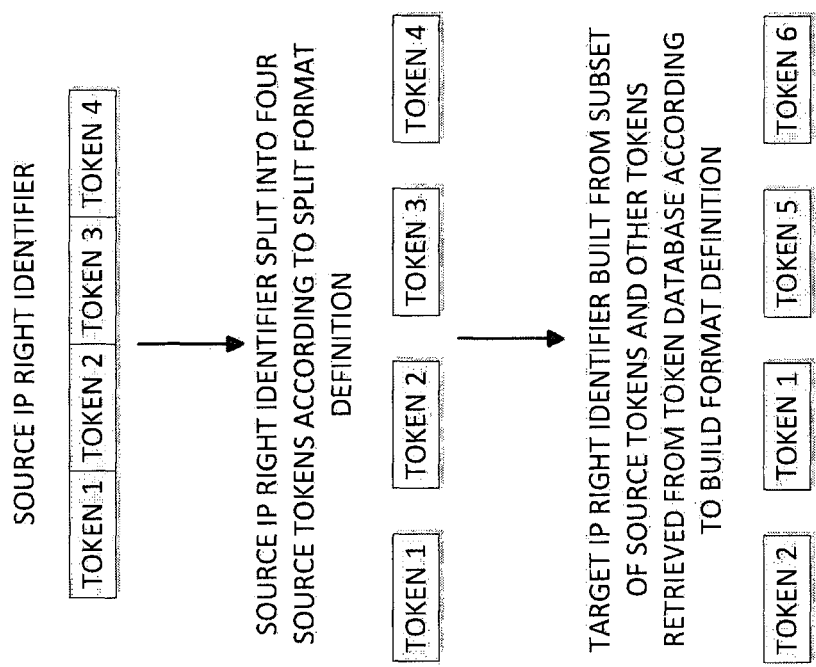
FIG. 4 is an exemplary example of validation and formatting of an IP right identifier in accordance with aspects of the present technique.

An example of validating and formatting an IP right identifier in accordance with aspects of the present technique via the validation and formatting engine 24 is illustrated in FIG. 4. A source IP right identifier comprising of four component tokens (e.g., token 1, token 2, token 3, and token 4 in that order) is accessed by the validation and formatting engine. The IP right splitter parses and separates the source IP right identifier into four source or components tokens based on individual token format definitions. Further, the IP right matcher matches and validates each of these four source tokens against a list of a list of acceptable and unacceptable tokens. During matching and validation, the acceptable source tokens (say, token 1 and token 2) are retained while for the unacceptable source tokens (say, token 3 and token 4) most suitable tokens are identified (say, token 5 and token 6) from the token database. In certain embodiments, the most suitable token is the best match for the unacceptable token with highest weighted score.

Finally, the IP right builder builds a target IP right identifier from a subset of source tokens (say, token 1 and token 2) and other tokens (say, token 5 and token 6) retrieved from the token database based on the build format definition. It should be noted that not all the acceptable tokens may be employed to build the target IP right identifier as the build format definition may not require such tokens at all. In the illustrated embodiment, the target IP right identifier may therefore comprise of four component tokens (e.g., token 2, token 1, token 5, and token 6 in that order).

As will be appreciated by one skilled in the art, a variety of techniques may be employed to validate and format IP right identifiers. For example, the exemplary network system 10 and the associated validation and formatting engine 24 may validate and format IP right identifiers by the techniques discussed herein. In particular, as will be appreciated by those of ordinary skill in the art, control logic and/or automated routines for performing the techniques and steps described herein may be implemented by the network system 10, either by hardware, software, or combinations of hardware and software. For example, suitable code may be accessed and executed by the one or more processors on the network system 10 to perform some or all of the techniques described herein. Similarly application specific integrated circuits (ASICs) configured to perform some or all of the techniques described herein may be included in the one or more processors on the network system 10.

Figure 5:
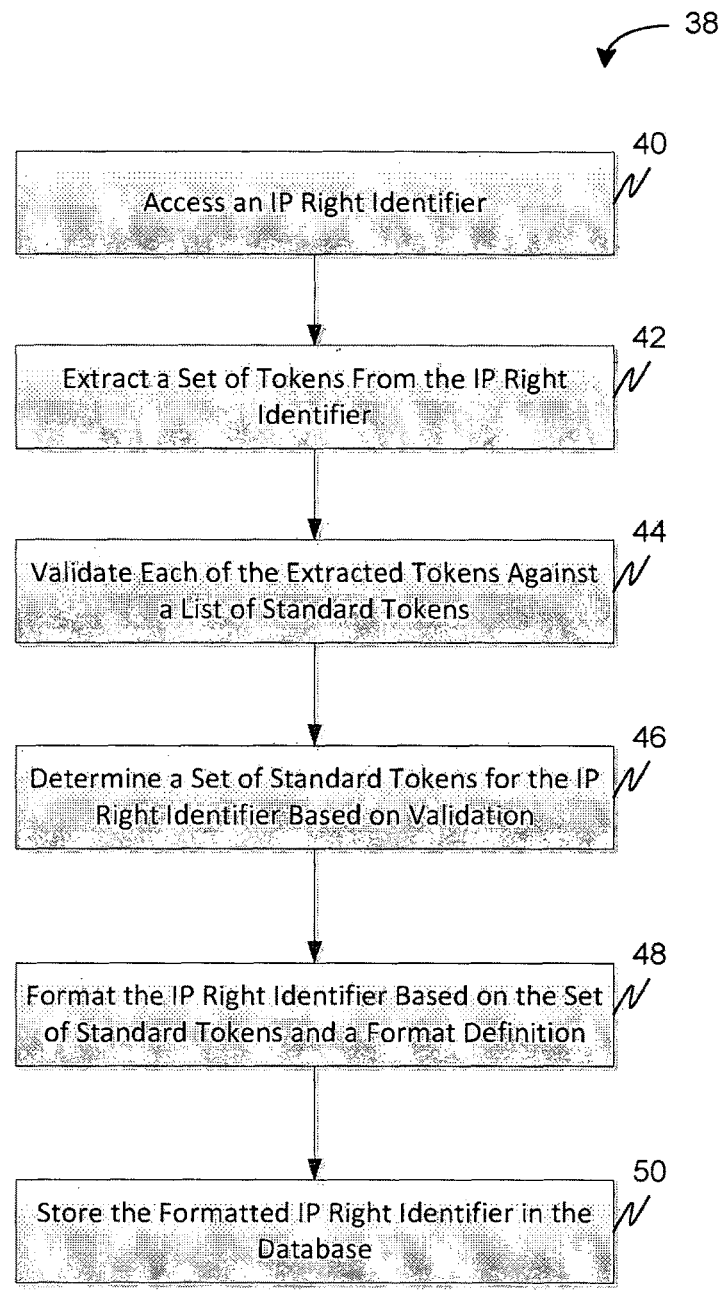
FIG. 5 is a flowchart illustrating an exemplary process for validating and formatting IP right identifiers in accordance with aspects of the present technique.

Referring now to FIG. 5, exemplary control logic 38 for validating and formatting IP right identifiers via a network system, such as system 10, is depicted via a flowchart in accordance with aspects of the present invention. As illustrated in the flowchart, the control logic 38 includes the steps of accessing an IP right identifier from a database at step 40, extracting a set of tokens from the IP right identifier at step 42, validating each of the extracted tokens against a list of standard tokens at step 44, determining a set of standard tokens for the IP right identifier based on the validation at step 46, formatting the IP right identifier based on the set of standard tokens and a format definition at step 48, and storing the formatted IP right identifier in a database at step 50.

In certain embodiments, validating each of the extracted tokens against a list of standard tokens at step 44 includes determining a best match for each of the extracted tokens from the list of standard tokens. The best match for each of the extracted tokens from the list of standard tokens comprises a match with highest weighted score. Additionally, in certain embodiments, determining a set of standard tokens for the IP right identifier at step 46 includes converting each of the extracted tokens to a corresponding standard token based on the best match. Further, in certain embodiments formatting the IP right identifier based on the set of standard tokens and a format definition at step 48 comprises applying the format definition to the set of standard tokens. It should be noted that the format definition may be based on user defined rules. The user may include, but is not limited to, a client, a renewal service provider, a renewal payment agency, or a patent and trademark office. The set of standard tokens and the format definition may be reasonably independent of client-specific formatting rules and definition and may involve standard (e.g., law-related) formatting rules and definition.

As will be also appreciated, the preferred and alternative embodiments may take the form of specialized computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
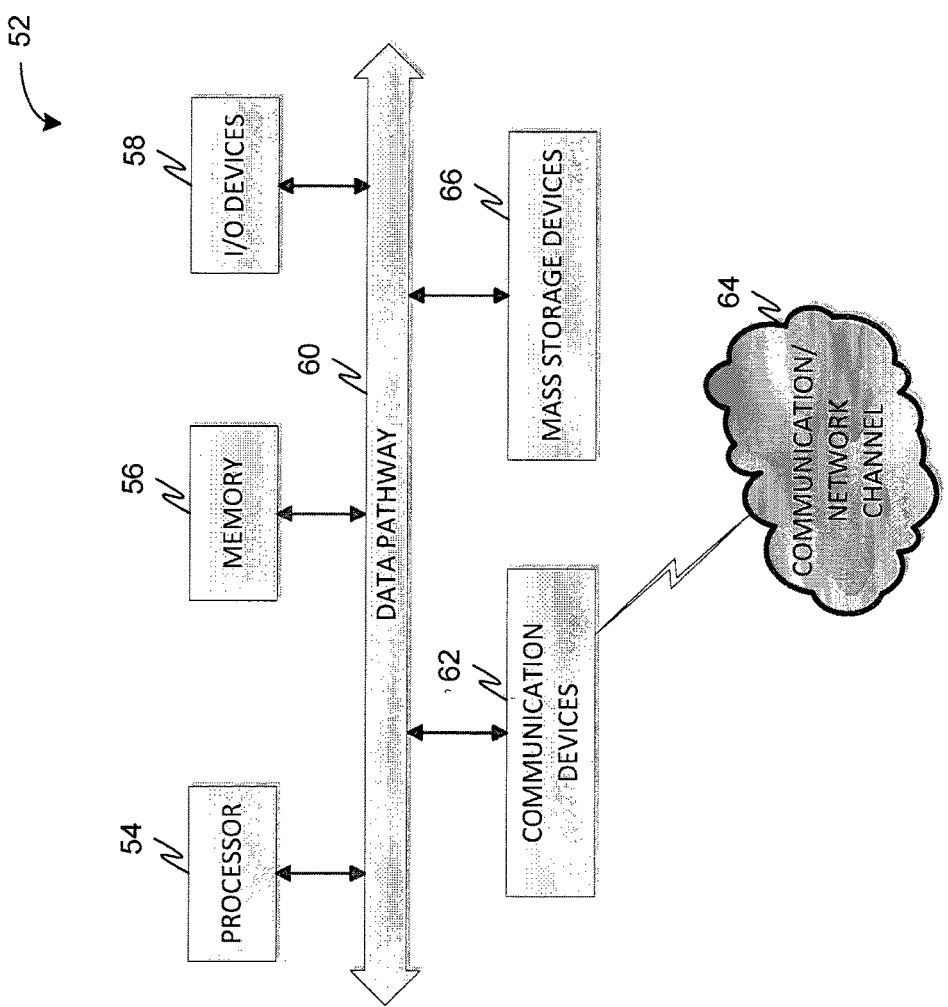
FIG. 6 is a schematic of a computer system for validating and formatting IP right identifiers in accordance with aspects of the present technique.

Referring now to FIG. 6, a schematic of a computer system 52 is illustrated in accordance with aspects of the present technique. The computer system 52 is configured to automatically perform validation and formatting of IP right identifiers. The computer system 52 generally includes a processor 54, a memory 56, and input/output ("I/O") devices 58 connected via a data pathway (e.g., buses) 60. Although only one processor 54 is shown, in certain embodiments, the computer system may include more processors in an expanded or distributed design.

The processor 54 accepts instructions and data from the memory 56 and performs various data processing functions of the system. These data processing functions may include, but are not limited to, accessing and parsing an IP right identifier, extracting one or more tokens from the IP right identifier, validating and formatting the IP right identifier into a standard format, and so forth. The processor 54 includes an arithmetic logic unit (ALU) that performs arithmetic and logical operations, and a control unit that extracts instructions from memory 56 and decodes and executes them, calling on the ALU when necessary. The memory 56 stores a variety of data received by the system 52 and computed by the various data processing functions of the system 52. The data may include, for example, user-defined IP right identifier, a list of standard tokens, format definition, validated and formatted IP right identifier, and so forth. The memory 56 generally includes a random-access memory (RAM) and a read-only memory (ROM); however, there may be other types of memory such as programmable read-only memory (PROM), erasable programmable read-only memory (EPROM) and electrically erasable programmable read-only memory (EEPROM). Also, the memory 56 preferably contains an operating system, which executes on the processor 54. The operating system performs basic tasks that include recognizing input, sending output to output devices, keeping track of files and directories and controlling various peripheral devices. The information in the memory 56 might be conveyed to a human user through the input/output devices 58, the data pathway 60, or in some other suitable manner.

The input/output devices 58 may include a keyboard and a mouse that enables a user to enter data and instructions into the computer system 52, a display device that enables the user to view the available information, and a printer that enables the user to print any data for his reference. The computer system 52 may further include a communication device 62 such as a telephone, cable or wireless modem; or a network card such as an Ethernet adapter, local area network (LAN) adapter, integrated services digital network (ISDN) adapter, or Digital Subscriber Line (DSL) adapter; a USB port; IEEE 1394 port; and so forth, that enables the computer system 52 to access other computers and resources on a communication network 64. The communication network 64 may be a wired or a wireless communication network such as Internet, LAN or wide area network (WAN). The computer system 52 may also include a mass storage device 66 to allow the computer system 52 to retain large amounts of data permanently. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 52 may take the form of a hand-held digital computer, personal digital assistant computer, notebook computer, personal computer, workstation, mini-computer, mainframe computer or supercomputer.

As will be appreciated by those skilled in the art, the technique described in the various embodiments discussed above results in efficient and effective validation of IP right identifier. The technique also enables formatting of the IP right identifiers so as to confirm to an acceptable standard. Additionally, as discussed above, the technique enables a large number of different formats to co-exist for the same IP right identifier, resulting in greater efficiency and efficacy in communication among multiple users.

Further, as will be appreciated by those skilled in the art, the techniques described in the various embodiments discussed above may be applied in the field of IP renewals, IP data exchange, IP docketing, and so forth. Moreover, the above discussed technique may be useful in setting a high quality and globally accepted standard for IP right identifier.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for validating and formatting intellectual property (IP) asset identification codes, the method comprising:
   accessing an IP asset identification code from a database, the IP asset identification code comprising a string of text used to identify a particular IP asset;
   splitting the IP asset identification code to extract therefrom a set of tokens associated with the particular IP asset, the set of tokens including at least one of a country code token, an IP type token, a date token and a number type token;
   validating each token in the set of tokens by comparing each token to a list of acceptable and unacceptable tokens therefor, the validating including identifying one or more acceptable tokens and one or more unacceptable tokens from among the set of tokens;
   determining one or more standard tokens that correspond to the one or more unacceptable tokens;
   reformatting the IP asset identification code based on the one or more acceptable tokens, the one or more standard tokens, and a format definition; and
   storing the reformatted IP asset identification code in a database.

2. The method of claim 1, wherein the validating comprises determining a best match for each token in the set of tokens from the list of acceptable and unacceptable token.

3. The method of claim 2, wherein determining the best match comprises determining a match with a highest weighted score.

4. The method of claim 2, wherein determining the one or more standard tokens comprises converting each unacceptable token in the set of tokens to a corresponding standard token based on the best match.

5. The method of claim 1, wherein reformatting comprises applying the format definition to the one or more standard tokens and the one or more acceptable tokens.

6. The method of claim 1, wherein the format definition is based on user defined rules, and wherein the user comprises a client, a renewal service provider, a renewal payment agency, or a patent office.

7. A system comprising:
   a processor executing a validation and formatting engine to access an intellectual property (IP) asset identification code from a database, the IP asset identification code comprising a string of text used to identify a particular IP asset, to tokenize the IP asset identification code to extract therefrom a set of tokens associated with the particular IP asset, the set of tokens including at least one of a country code token, an IP type token, a date token and a number type token, to validate each token in the set of tokens by comparing each token to a list of acceptable and unacceptable tokens therefor, the validating including identifying one or more acceptable tokens and one or more unacceptable tokens from among the set of tokens, to determine one or more standard tokens that correspond to the one or more unacceptable tokens, to reformat the IP asset identification code based on the one or more acceptable tokens, the one or more standard tokens, and a format definition, and to store the reformatted IP asset identification code in a database.

8. The system of claim 7, wherein the engine is configured to validate by determining a best match for each token in the set of tokens from the list of acceptable and unacceptable tokens, and wherein the best match comprises a match with highest weighted score.

9. The system of claim 8, wherein the engine is configured to determine the one or more standard tokens by converting each unacceptable token in the set of tokens to a corresponding standard token based on the best match.

10. The system of claim 7, wherein the engine is configured to reformat by applying the format definition to the one or more standard tokens and the one or more acceptable tokens, wherein the format definition is based on user defined rules, and wherein the user comprises a client, a renewal service provider, a renewal payment agency, or a patent and trademark office.

11. A non-transitory machine-readable medium having computer-executable instructions for performing a method, comprising:
    accessing an intellectual property (IP) asset identification code from a database, the IP asset identification code comprising a string of text used to identify a particular IP asset;
    extracting a set of tokens associated with the particular IP asset through splitting of the IP asset, the set of tokens including at least one of a country code token, an IP type token, a date token and a number type token;
    validating each token in the set of tokens by comparing each token to a list of acceptable and unacceptable tokens therefor, the validating including identifying one or more acceptable tokens and one or more unacceptable tokens from among the set of tokens;
    determining one or more standard tokens that correspond to the one or more unacceptable tokens;
    reformatting the IP asset identification code based on the one or more acceptable tokens, the one or more standard tokens, and a format definition; and
    storing the reformatted IP asset identification code in a database.

* * * * *

UNITED STATES PATENT AND TRADEMARK OFFICE
CERTIFICATE OF CORRECTION

PATENT NO. : 9,904,710 B2
APPLICATION NO. : 14/401437
DATED : February 27, 2018
INVENTOR(S) : Nicholas John Church It is certified that error appears in the above-identified patent and that said Letters Patent is hereby corrected as shown below:

In the Specification

In Column 6, Line 49, delete "Identfier" and insert -- Identifier --, therefor.

In Column 6, Line 49, delete "Explantaory" and insert -- Explanatory --, therefor.

In the Claims

In Column 11, Line 41, in Claim 2, delete "token." and insert -- tokens. --, therefor.

Signed and Sealed this
Twenty-fourth Day of April, 2018

Andrei Iancu
*Director of the United States Patent and Trademark Office*